(12) United States Patent
Yang et al.

(10) Patent No.: US 11,383,411 B2
(45) Date of Patent: Jul. 12, 2022

(54) SHOE COMPONENT AND MANUFACTURING METHOD THEREOF

(71) Applicant: FENG TAY ENTERPRISES CO., LTD., Douliu (TW)

(72) Inventors: Tsung-Lin Yang, Douliu (TW); Yu-Ta Chang, Pitou Township (TW)

(73) Assignee: FENG TAY ENTERPRISES CO., LTD., Douliu (TW)

( * ) Notice: Subject to any disclaimer, the term of this patent is extended or adjusted under 35 U.S.C. 154(b) by 246 days.

(21) Appl. No.: 16/521,768

(22) Filed: Jul. 25, 2019

(65) Prior Publication Data
US 2020/0331180 A1    Oct. 22, 2020

(30) Foreign Application Priority Data
Apr. 18, 2019  (TW) .................................. 108113643

(51) Int. Cl.
| | |
|---|---|
| *B29C 44/58* | (2006.01) |
| *A43B 13/04* | (2006.01) |
| *B29C 44/02* | (2006.01) |
| *B29C 44/34* | (2006.01) |
| *B29C 44/42* | (2006.01) |

(Continued)

(52) U.S. Cl.
CPC ............ *B29C 44/588* (2013.01); *A43B 13/04* (2013.01); *B29C 44/02* (2013.01); *B29C 44/3403* (2013.01); *B29C 44/42* (2013.01); *B29K 2101/12* (2013.01); *B29K 2105/041* (2013.01);

(Continued)

(58) Field of Classification Search
CPC ... B29C 44/588; B29C 44/02; B29C 44/3403; B29C 44/42; A43B 13/04; B29K 2101/12; B29K 2105/041; B29K 2509/00; B29K 2995/0088; B29L 2031/504
See application file for complete search history.

(56) References Cited

U.S. PATENT DOCUMENTS

| | | | | |
|---|---|---|---|---|
| 5,665,785 | A | * | 9/1997 | McClellan ................. B60C 7/00 521/145 |
| 2004/0080070 | A1 | * | 4/2004 | Liu ........................ B29C 44/348 264/54 |

(Continued)

FOREIGN PATENT DOCUMENTS

| | | |
|---|---|---|
| CN | 105829417 A | 8/2016 |
| CN | 106398181 A | 2/2017 |

(Continued)

OTHER PUBLICATIONS

Schollenberger et al. ("Thermoplastic Polyurethane Elastomer Molecular Weight-Property Relationships, Further Studies" 1979, Journal of Elastomers and Plastics, vol. 11, pp. 58-91) (Year: 1979).*

(Continued)

*Primary Examiner* — Travis M Figg
(74) *Attorney, Agent, or Firm* — Tracy M Heims; Apex Juris, Pllc.

(57) ABSTRACT

A shoe component includes a foam member including a thermoplastic material and a mixed material mixed to each other, wherein the weight percentage of the thermoplastic material is 90 wt % to 99 wt %, and the weight percentage of the mixed material is 10 wt % to 1 wt %. A manufacturing method of the shoe component is also disclosed herein.

18 Claims, 5 Drawing Sheets

(51) Int. Cl.
  *B29K 101/12* (2006.01)
  *B29K 105/04* (2006.01)
  *B29K 509/00* (2006.01)
  *B29L 31/50* (2006.01)

(52) U.S. Cl.
  CPC .. *B29K 2509/00* (2013.01); *B29K 2995/0088* (2013.01); *B29L 2031/504* (2013.01)

(56) References Cited

U.S. PATENT DOCUMENTS

| | | | |
|---|---|---|---|
| 2005/0027025 A1* | 2/2005 | Erb | A43B 17/003 521/50 |
| 2006/0103042 A1 | 5/2006 | Tanaka et al. | |
| 2006/0235095 A1* | 10/2006 | Leberfinger | C08J 9/32 521/56 |
| 2015/0038607 A1* | 2/2015 | Baghdadi | C08J 9/122 521/137 |
| 2015/0181975 A1* | 7/2015 | Otsuka | A43B 13/12 36/28 |
| 2017/0267845 A1* | 9/2017 | Baghdadi | C08L 53/025 |
| 2018/0345544 A1* | 12/2018 | Darland | B29C 44/348 |
| 2018/0345575 A1* | 12/2018 | Constantinou | B29C 67/205 |
| 2019/0365028 A1* | 12/2019 | Fakhouri | A43B 13/04 |

FOREIGN PATENT DOCUMENTS

| | | |
|---|---|---|
| CN | 107722602 A | 2/2018 |
| CN | 109206892 A | 1/2019 |
| CN | 109385097 A | 2/2019 |
| EP | 1872924 A1 | 1/2008 |
| TW | I508837 B | 11/2015 |

OTHER PUBLICATIONS

Examination report for TW108113643, dated May 14, 2020, Total of 12 pages.
Search report for TW108113643, dated May 14, 2020, Total of 1 page.
English abstract for CN105829417, total of 1 page.
English abstract for CN106398181, total of 1 page.
English abstract for CN107722602, total of 1 page.
English abstract for TWI508837, total of 1 page.
India Examination report for 201914030133, dated Dec. 23, 2020, Total of 5 pages.
Molar mass distribution, Wikipedia, 4 pages.
Extended European search report for EP19192766.4, dated Mar. 11, 2020, Total of 8 pages.
English abstract for CN109206892, Total of 1 page.
English abstract for CN109385097, Total of 1 page.

* cited by examiner

Fig. 5 ial Field

The present disclosure relates generally to a shoe component and a manufacturing method thereof, and more particularly to a Microcellular foam shoe component and a manufacturing method thereof.

2. Description of Related Art

Generally, components of a foam shoe component usually includes ethylene vinyl acetate (EVA) and thermoplastic polyurethane (TPU), wherein EVA naturally has properties of lightweight, soft, shockproof and heat insulation, and the price of EVA is lower than that of TPU, so a midsole of a shoe is usually made from EVA.

Though EVA has the aforementioned advantages, the foam shoe component made from EVA, such as a midsole, has poor physical properties; for example, said shoe component is poor in durability and compression set, and said shoe component after injection molding is poor in size stability. In addition, the process of EVA injection molding, which is a chemical foam process, has cumbersome steps, so that the process is usually time-consuming. Further, for the process of EVA injection molding needs to add chemical foaming agent and crosslinking agent, such as dicumyl peroxide (DCP), the shoe component containing chemical foaming agent and crosslinking agent is not easy to be decomposed, which is not recyclable, so that EVA is not an environmentally friendly material. Furthermore, most of chemical foaming agent and crosslinking agent are environmental hormones, which are poisonous to human bodies and the environment.

In view of the above, the person in the art developed a physical foaming process which could be made foam shoe components from TPU, whereby to take the place of the chemical foaming process of EVA. However, current foaming shoe components made by the physical foaming process of TPU have higher specific gravity and thicker thickness. Besides, in current physical foaming process of shoe components by injection molding, the products are generally formed as flat-shaped foaming bodies, which are not easy to be three-dimensional foaming bodies having curved surfaces, and are not easy to have a volume ratio to the mold being 1:1. Further, for the evenness of bore size of foaming bodies is difficult to be regulated, the productivity of the foaming shoe components becomes worse.

At least for the above reasons, the conventional foaming shoe components and the manufacturing method thereof still have room for improvements.

BRIEF SUMMARY OF THE INVENTION

In view of the above, the primary objective of the present disclosure is to provide a shoe component and a manufacturing method thereof; through the Microcellular foam process with supercritical fluid provided in the present disclosure, the environmental hazard from the conventional chemical foaming process could be improved, and the uneven quality of the conventional foaming products could be improved, too. The foaming products provided in the present disclosure is suitable to be made into several shoe components including midsole, outsole, overlay of upper or sole and insole, but not limited thereto.

The present disclosure provides a shoe component including a foaming body. The foaming body includes a thermoplastic material and a mixed material, wherein the weight percentage of the thermoplastic material is 90 wt % to 99 wt %, and the weight percentage of the mixed material is 10 wt % to 1 wt %.

In addition, the present disclosure provides a manufacturing method of a shoe component, which includes following steps: making a predetermined gas pressure in a mold; injecting a predetermined dose of a thermoplastic foaming fluid into the mold; releasing the predetermined gas pressure of the mold; and obtaining said shoe component from the mold.

With the aforementioned design, through the Microcellular foam process with supercritical fluid, the foaming shoe component could be made by a physical process, so that the foaming shoe component provided in the present disclosure has a plurality of foaming bores which are dense and uniform, whereby to increase whole mechanical strength of the foaming shoe component. Furthermore, comparing to the conventional foaming shoe component, the foaming shoe component provided in the present disclosure has greater physical properties, such as less bore diameter, greater resilience, less compression set, and greater tear strength.

BRIEF DESCRIPTION OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
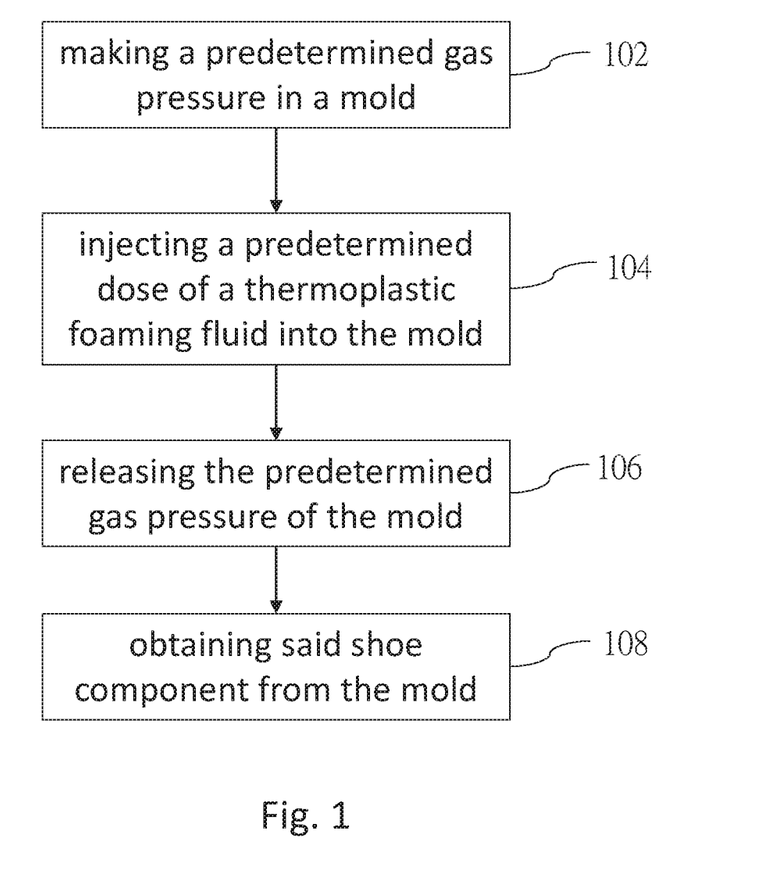
FIG. 1 is a flow chart of the manufacturing method of the shoe component according to one preferred embodiment of the present disclosure.

In order to illustrate the present disclosure more clearly, the preferred embodiment, the first embodiment, the second embodiment and the accompanying drawings are described in detail below. As illustrated in FIG. 1, the flow chart of the manufacturing method of the shoe component according to one preferred embodiment of the present disclosure is shown, which includes a plurality of steps as follows:

Step 102: making a predetermined gas pressure in a mold;
Step 104: injecting a predetermined dose of a thermoplastic foaming fluid into the mold;
Step 106: releasing the predetermined gas pressure of the mold; and
Step 108: providing said shoe component from the mold.

In embodiments of the present disclosure, the shoe component in Step 108 is a foaming shoe component, the shoe component includes a foaming body, and according to embodiments of the present disclosure, the foaming body of the shoe component has a Asker C hardness range of 40 to 70, and more preferably, has a Asker C hardness range of 50 to 60. Further, the foaming body of the shoe component has a plurality of bores, and a diameter of each of the bores is in a range of 0.1 µm to 100 µm. According to embodiments of the present disclosure, a diameter of each of the bores is preferably in a range of 0.1 µm to 50 µm. According to one preferred embodiment of the present disclosure, a diameter of each of the bores is more preferably in a range of 0.1 µm to 10 µm. When the diameter of each of the bores becomes smaller, the bore density of the foaming body of the shoe component becomes greater.

In addition, the foaming body of the shoe component made by the manufacturing method of the shoe component according to one preferred embodiment of the present disclosure has a specific gravity greater than or equal to 0.1 g/cm$^3$. According to one preferred embodiment of the present disclosure, a specific gravity of the foaming body in a range of 0.2 to 0.5 g/cm$^3$. According to another one preferred embodiment of the present disclosure, the foaming body has a specific gravity in a range of 0.1 to 0.3 g/cm$^3$.

On the other hand, the foaming body of the shoe component made by the manufacturing method of the shoe component according to one preferred embodiment of the present disclosure has a resilience greater than or equal to 40% (measured according to ASTM D-2632). According to one preferred embodiment of the present disclosure, a resilience of the foaming body is in a range of 50% to 80%. According to embodiments of the present disclosure, a compression set of the foaming body is less than 50% (measured according to ASTM D-395B). According to embodiments of the present disclosure, a tear strength of the foaming body is in a range of 10 to 30 kg/cm (measured according to ASTM D-624).

It is worthy to mention that, a general foaming physical process is not only difficult to form a dense and uniform foaming material, but also difficult to form a three-dimensional foaming material having a complicated structure. However, the manufacturing method of the shoe component according to one preferred embodiment of the present disclosure could be used to manufacture foaming bodies having flat or three-dimensional structure with dense and even foaming bores. Further, the shoe components made from said foaming bodies having three-dimensional structure could have a curved profile. Accordingly, the manufacturing method of the shoe component according to one preferred embodiment of the present disclosure could significantly expand the practical application range of the foaming material in the technical field of the present disclosure. For example, the manufacturing method according to embodiments of the present disclosure is used not only to manufacture shoe components of shoes having greater resilience and greater functionality (such as sports shoes), but also to manufacture shoe components of common shoes (such as casual shoes and slippers). Such shoe components include, but are not limited to, midsole, outsole, overlay of upper or sole and insole.

In embodiments of the present disclosure, the foaming body includes a thermoplastic material and a mixed material, wherein the weight percentage of the thermoplastic material is 90 wt % to 99 wt %, and the thermoplastic material and the mixed material are integrated, and the weight percentage of the mixed material is 10 wt % to 1 wt %.

In accordance with embodiments of the present disclosure, the thermoplastic material includes thermoplastic polyurethane, polyamide, polyester, ionomer or a combination thereof. In embodiments of the present disclosure, the molecular weight of the thermoplastic material is in a range of 30,000 to 100,000, and more preferably, is in a range of 50,000 to 80,000. If the molecular weight of the thermoplastic material is less than 30,000, the foaming body would have poor structural strength, which could not provide dense bores efficiently, so that said bores would be broken easily, whereby the density of the bores is difficult to be regulated. If the molecular weight of the thermoplastic material is greater than 100,000, the generation of the bores would be inhibited because the foaming body has a greater structural strength.

In accordance with embodiments of the present disclosure, the mixed material includes a filler which comprises a mineral fiber, calcium carbonate ($CaCO_3$), silica, talcum powder, sodium bicarbonate ($NaHCO_3$) or a combination thereof. In embodiments of the present disclosure, the mineral fiber includes slag fiber, rock fiber and a combination thereof, wherein the slag fiber could be slag wool, and the rock fiber could be rock wool. In accordance with embodiments of the present disclosure, the mixed material includes a physical foaming material which is a thermally expanded hollow material. In embodiments of the present disclosure, the thermal expanded hollow material could be hollow plastic microspheres (such as Expancel provided from AkzoNobel).

Referring to FIG. 1, in Step 102 of embodiments of the present disclosure, the predetermined gas pressure is in a range of 5 to 50 bar. In Step 104 of embodiments of the present disclosure, the predetermined dose is in a range of 10% to 50% of a cavity volume of the mold. In Step 102 of one preferred embodiment of the present disclosure, the predetermined gas pressure is in a range of 20 to 50 bar. In Step 102 of another one preferred embodiment of the present disclosure, the predetermined gas pressure is in a range of 5 to 20 bar.

In Step 104 of embodiments of the present disclosure, the thermoplastic foaming fluid includes, but not limited thereto, a thermoplastic material, a mixed material and a supercritical fluid uniformly blended with each other, wherein the supercritical fluid includes supercritical $N_2$ fluid or supercritical $CO_2$ fluid. In one preferred embodiment of the present disclosure, the thermoplastic foaming fluid includes said thermoplastic material, said filler and said supercritical fluid uniformly blended with each other, wherein said supercritical fluid includes supercritical $N_2$ fluid or supercritical $CO_2$ fluid. In another one preferred embodiment of the present disclosure, the thermoplastic foaming fluid includes said thermoplastic material, said physical foaming material and said supercritical fluid uniformly blended with each other, wherein said supercritical fluid includes supercritical $N_2$ fluid or supercritical $CO_2$ fluid.

Figure 2:
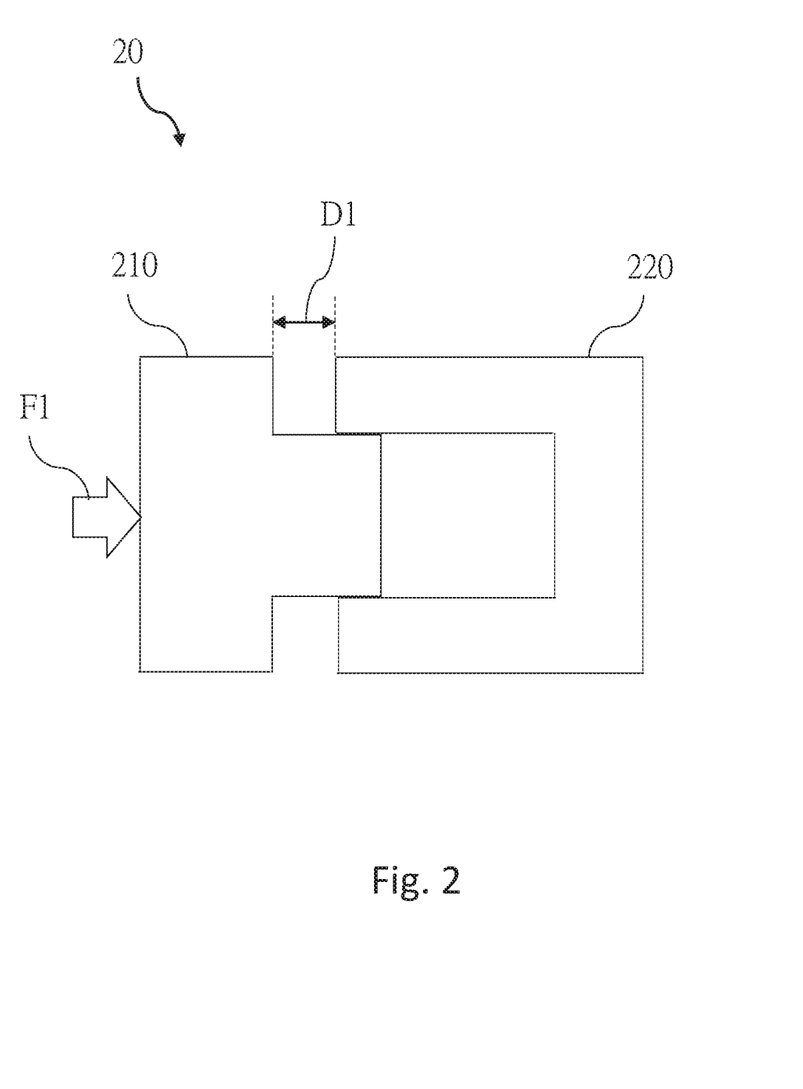
FIG. 2 is a schematic diagram of the mold according to a first embodiment of the present disclosure, wherein the mold is at a first position.
Figure 3:
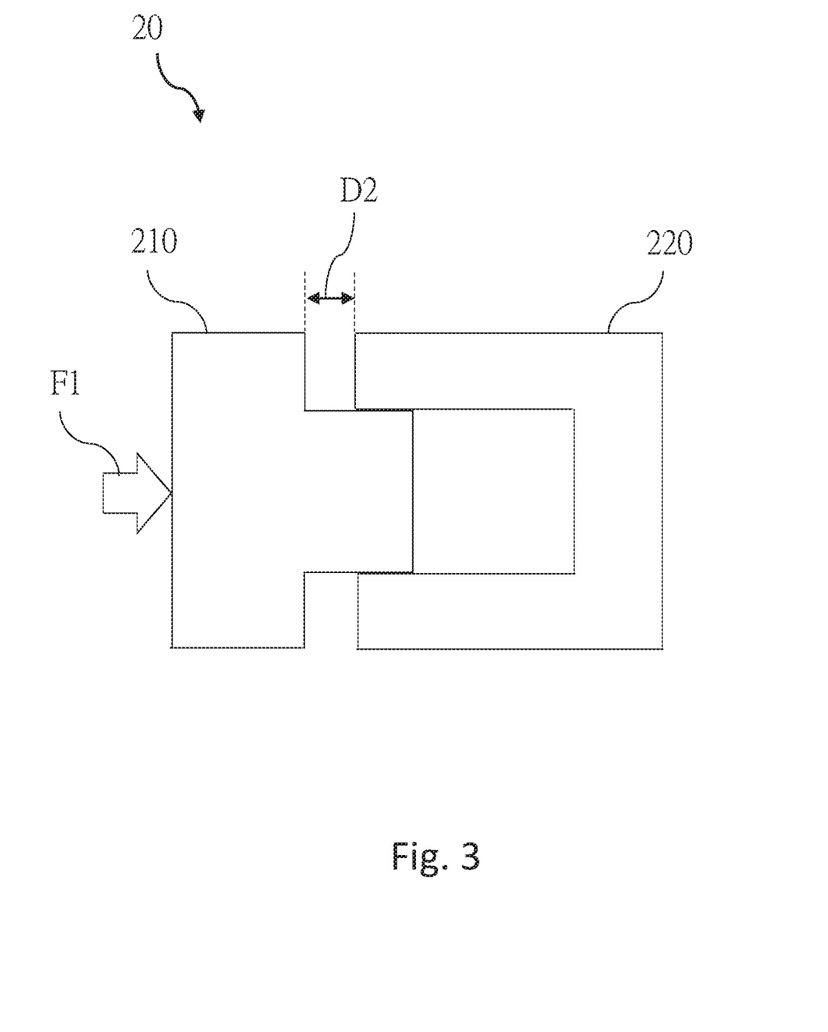
FIG. 3 is a schematic diagram of the mold according to the first embodiment of the present disclosure, wherein the mold is at a second position.

According to the first embodiment of the present disclosure, as shown in FIG. 2 and FIG. 3, the mold 20 includes a first molding member 210 and a second molding member 220, wherein the first molding member 210 and the second molding member 220 are correspondingly mated, and the first molding member 210 can be moved relative to the second molding member 220 by an external force F1. In Step 106 of FIG. 1, the step of releasing the predetermined gas pressure of the mold performs in a process of the first molding member 210 moved from a first position (as shown in FIG. 2) to a second position (as shown in FIG. 3) by the external force F1. In FIG. 2, when the first molding member 210 is at the first position, a shortest distance of the first molding member 210 to the second molding member 220 is defined as a first distance D1. In FIG. 3, when the first molding member 210 is at the second position, a shortest distance of the first molding member 210 to the second molding member 220 is defined as a second distance D2, and the first distance D1 is greater than the second distance D2. In embodiments of the present disclosure, when the first molding member 210 is moved from the first position to the second position by the external force F1, the foaming material could be compressed, for a cavity volume of the mold 20 becomes less, whereby the specific gravity of the foaming shoe component in the mold 20 is increased, and the density of the foaming bores of the foaming shoe component is also increased, so that a volume of the shoe component could be substantially identical to the cavity volume of the mold 20. In embodiments of the present disclosure, a ratio of the cavity volume of the mold to the volume of the shoe component is 1:0.98 to 1:1.02.

Figure 4:
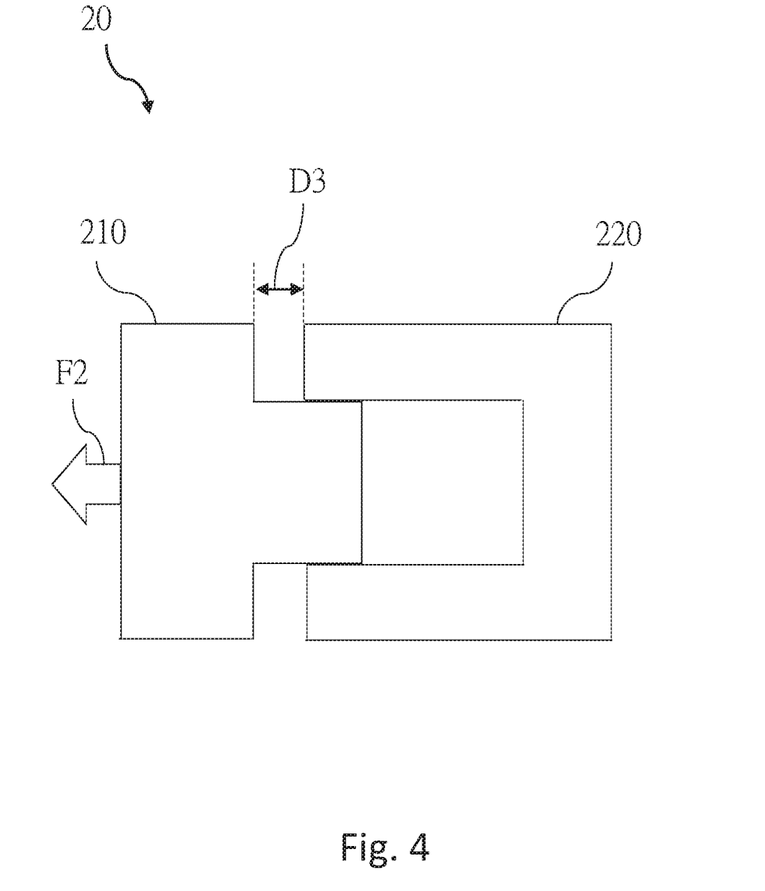
FIG. 4 is a schematic diagram of the mold according to a second embodiment of the present disclosure, wherein the mold is at a first position.
Figure 5:
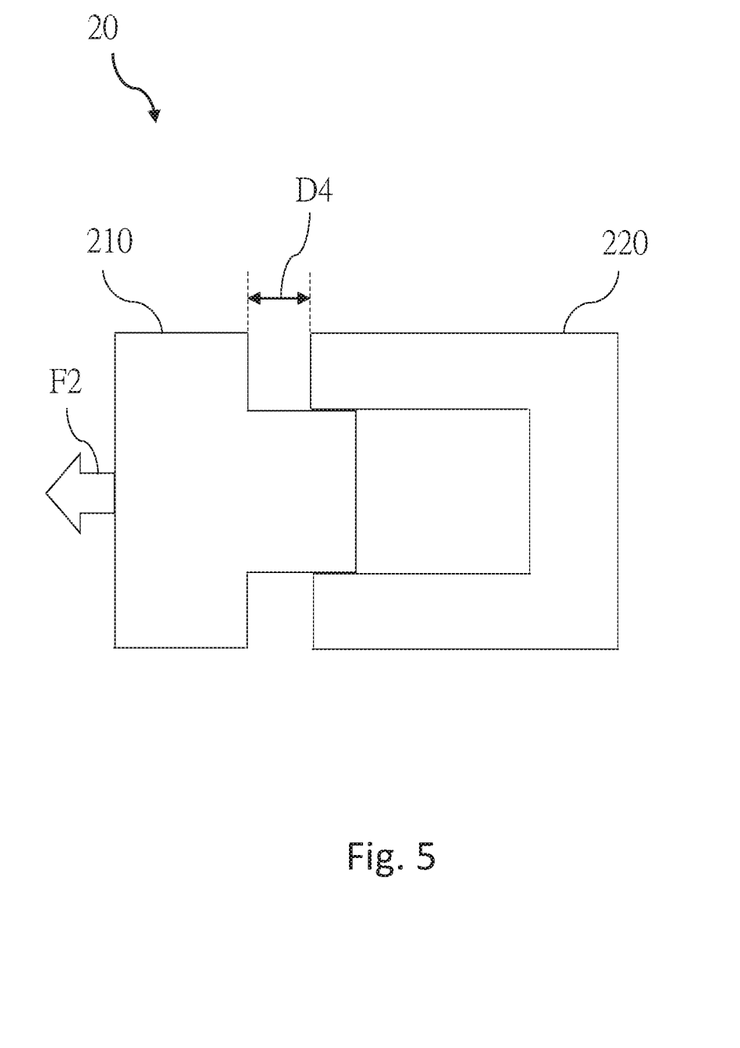
FIG. 5 is a schematic diagram of the mold according to the second embodiment of the present disclosure, wherein the mold is at a second position.

According to the second embodiment of the present disclosure, as shown in FIG. 4 and FIG. 5, the mold 20 includes a first molding member 210 and a second molding member 220, wherein the first molding member 210 and the second molding member 220 are correspondingly mated, and the first molding member 210 can be moved relative to the second molding member 220 by an external force F2. In Step 106 of FIG. 1, the step of releasing the predetermined gas pressure of the mold performs in a process of the first molding member 210 moved from a first position (as shown in FIG. 4) to a second position (as shown in FIG. 5) by the external force F2. Through the first molding member 210 is pulled toward the second molding member 220, a foaming space in the mold 20 could be increased, so as to decrease the specific gravity of the foaming body.

In FIG. 4, when the first molding member 210 is at the first position, a shortest distance of the first molding member 210 to the second molding member 220 is defined as a first distance D3. In FIG. 5, when the first molding member 210 is at the second position, a shortest distance of the first molding member 210 to the second molding member 220 is defined as a second distance D4, and the first distance D3 is less than the second distance D4. In embodiments of the present disclosure, when the first molding member 210 is moved from the first position to the second position by the external force F2, the foaming space in the mold 20 is increased, for the cavity volume of the mold 20 becomes greater, whereby to decrease the specific gravity of the foaming shoe component, and to increase diameters of the foaming bores of the foaming shoe component. In the first embodiment and the second embodiment of the present disclosure, the first molding member 210 is moved from the first position to the second position in a speed of 1 to 20 m/s.

In embodiments of the present disclosure, when the predetermined gas pressure of the mold 20 is released, the gas pressure of the mold 20 becomes less, and even would be zero. It is worthy to mention that, in embodiments of the present disclosure, the mold 20 has a pressure releasing hole (not shown) which is used to release the gas pressure of the mold 20, whereby to decrease the gas pressure of the mold 20. Further, the supercritical fluid in the thermoplastic foaming fluid would be gasified to generate a plurality of microbubbles, whereby to form the foaming shoe component. In embodiments of the present disclosure, the gas pressure of the mold 20 is released to 0 bar in 0.2 to 12 seconds. According to embodiments of the present disclosure, the gas pressure of the mold 20 released to 0 bar is in 1, 5 or 10 seconds. In embodiments of the present disclosure, the temperature of the mold 20 keeps in 20 to 60° C. in the manufacturing process of the shoe component.

As mentioned in Step 108 of FIG. 1, after providing the foaming shoe component from the mold 20, a ratio of the cavity volume of the mold 20 to the volume of the shoe component is 1:0.98 to 1:1.02; for example, the ratio could be 1:0.98, 1:0.99, 1:1, 1:1.01 or 1:1.02. Accordingly, the shoe component made by the manufacturing method of the shoe component according to one preferred embodiment of the present disclosure has a volume which is substantially identical to the cavity volume of the mold 20, so that the shoe component provided from embodiments of the present disclosure could have a precisely predetermined volume through the design of the cavity of the mold 20, whereby the following trimming of shoe components could be avoided, which reduces the production of waste. Further, the manufacturing method of the shoe component according to embodiments of the present disclosure could precisely regulate a volume of the shoe component, whereby the following trimming of shoe components could be avoided, which reduces the production of waste, so that the manufacturing method meets the purpose of environmental protection with energy saving and waste reduction.

As mentioned above, through the Microcellular foam process with supercritical fluid, the foaming shoe component could be made by a physical process, so that the foaming shoe component provided in the present disclosure has a plurality of foaming bores which are dense and uniform, whereby to increase whole mechanical strength of the foaming shoe component. Furthermore, comparing to the conventional foaming shoe component, the foaming shoe component provided in the present disclosure has greater physical properties, such as smaller bore diameter, greater resilience, less compression set, and greater tear strength.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A foaming shoe component, comprising:
   90 to 99% by weight of a thermoplastic material; and
   1 to 10% by weight of a mixed material, which is mixed with the thermoplastic material;
   wherein the molecular weight of the thermoplastic material is in a range of 30,000 to 100,000;
   wherein the foaming shoe component has a resilience which is in a range of 50% to 80%, a compression set which is less than 50%, and a tear strength which is in a range of 10 to 30 kg/cm;
   wherein the foaming shoe component is made by a process to provide a ratio of a cavity volume of a mold to a volume of the foaming shoe component in a range of 1:0.98 to 1:1.02; wherein the process comprises:
   uniformly blending the thermoplastic material, the mixed material, and a supercritical fluid with each other to obtain a thermoplastic foaming fluid; injecting the thermoplastic foaming fluid into the mold, wherein a predetermined gas pressure in the mold is in a range of 5 to 50 bar; after the predetermined gas pressure of the mold is released, gasifying the supercritical fluid in the thermoplastic foaming fluid to form the foaming shoe component, wherein the foaming shoe component has a specific gravity in a range of 0.1 to 0.3 g/cm$^3$.

2. The shoe component of claim 1, wherein the thermoplastic material comprises thermoplastic polyurethane, polyamide, polyester, ionomer or a combination thereof.

3. The shoe component of claim 1, wherein the molecular weight of the thermoplastic material is in a range of 50,000 to 80,000.

4. The shoe component of claim 1, wherein the mixed material comprises a filler which comprises a mineral fiber, calcium carbonate ($CaCO_3$), silica, talcum powder, sodium bicarbonate ($NaHCO_3$) or a combination thereof.

5. The shoe component of claim 1, wherein the foaming body comprises a plurality of bores, and diameters of the bores are in a range of 0.1 μm to 100 μm.

6. The shoe component of claim 5, wherein the shoe component is a midsole of a shoe.

7. The shoe component of claim 1, wherein the predetermined gas pressure in the mold is in a range of 5 to 20 bar.

8. The shoe component of claim 1, wherein the predetermined gas pressure in the mold is in a range of 20 to 50 bar.

9. A method of manufacturing a shoe component, comprising:
    making a predetermined gas pressure in a mold, wherein the predetermined gas pressure is in a range of 5 to 50 bar;
    injecting a predetermined dose of a thermoplastic foaming fluid into the mold, wherein the predetermined dose is in a range of 10% to 50% of a cavity volume of the mold;
    releasing the predetermined gas pressure of the mold; and
    obtaining the shoe component of claim 1 from the mold.

10. The method of claim 9, wherein the predetermined gas pressure is in a range of 20 to 50 bar.

11. The method of claim 9, wherein the predetermined gas pressure is in a range of 5 to 20 bar.

12. The method of claim 9, wherein the thermoplastic foaming fluid comprises a thermoplastic material, a mixed material and a supercritical fluid uniformly blended with each other.

13. The method of claim 12, wherein the mixed material comprises a filler which comprises a mineral fiber, calcium carbonate ($CaCO_3$), silica, talcum powder, sodium bicarbonate ($NaHCO_3$) or a combination thereof.

14. The method of claim 12, wherein the mixed material comprises a physical foaming material which is a thermal expanded hollow material.

15. The method of claim 9, wherein the mold comprises a first molding member and a second molding member correspondingly mated to the first molding member; the first molding member can be moved relative to the second molding member by an external force.

16. The method of claim 15, wherein the step of releasing the predetermined gas pressure of the mold performs in a process of the first molding member moved from a first position to a second position by the external force.

17. The method of claim 16, wherein when the first molding member is at the first position, a shortest distance of the first molding member to the second molding member is defined as a first distance; when the first molding member is at the second position, a shortest distance of the first molding member to the second molding member is defined as a second distance, the first distance is less than the second distance.

18. The method of claim 16, wherein when the first molding member is at the first position, a shortest distance of the first molding member to the second molding member is defined as a first distance; when the first molding member is at the second position, a shortest distance of the first molding member to the second molding member is defined as a second distance, the first distance is greater than the second distance.

* * * * *